UNITED STATES PATENT OFFICE.

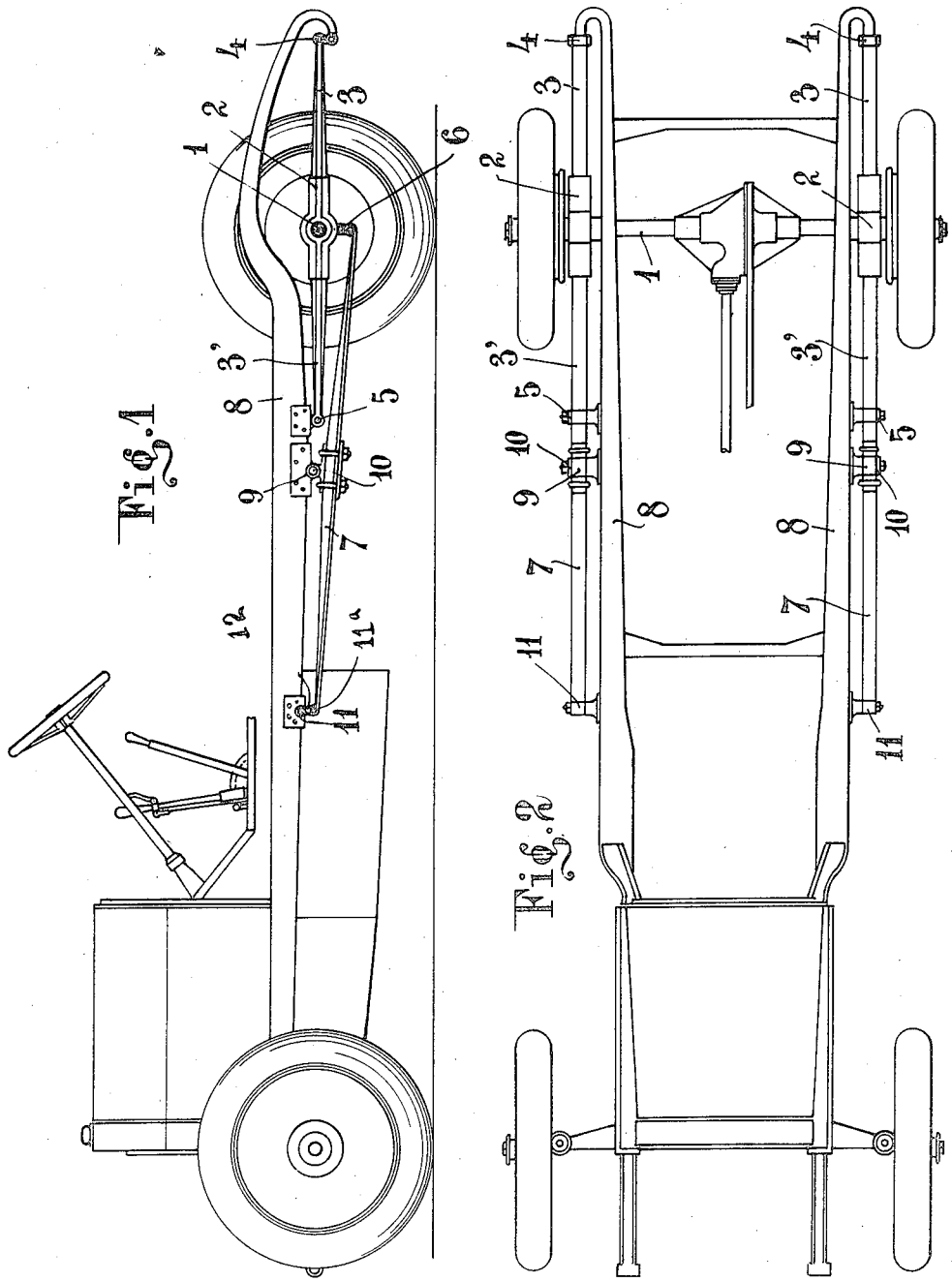

VINCENZO LANCIA, OF TURIN, ITALY.

SPRING SUSPENSION FOR MOTOR-VEHICLES.

1,281,590.   Specification of Letters Patent.   Patented Oct. 15, 1918.

Application filed May 1, 1918.   Serial No. 231,880.

*To all whom it may concern:*

Be it known that I, VINCENZO LANCIA, a subject of the King of Italy, residing at Turin, Italy, have invented certain new and useful Improvements in Spring Suspensions for Motor-Vehicles, of which the following is a specification.

It is the type of spring suspension for motor vehicles known as cantaliver type, in which the rear axle of the vehicle is connected with the free end of a laminated spring, this spring being pivoted by its middle portion to the vehicle frame and having its opposite end connected with the same vehicle frame by means of links.

This invention has for its object to provide a spring suspension securing at the same time the advantages of both the cantaliver and ordinary semi-elliptical springs.

The annexed drawing shows by way of example a construction of the spring suspension according to this invention as applied to a line axle car.

Figure 1 is a diagrammatic side view of a motor vehicle frame provided with a spring suspension according to this invention, and Fig. 2 is the plan view of the same.

As shown in the drawing each end of the rear axle 1 of the vehicle passes through a sleeve 2 to which are secured two laminated spring sections 3, 3', connected at 4 and 5 with the vehicle frame and forming on the whole an ordinary spring of semi-elliptical type.

Said rear axle 1 may be mounted to rotate in the sleeve 2 or be set solid in the same according to the requirements.

To the sleeve 2 is further connected, by means of a link 6, one end of a laminated spring 7, which is pivoted at its intermediate portion to the frame 8 of the vehicle by means of an eye 9 and pivot pin 10, the opposite end of said spring 7 being also connected with the frame by the pivot pins 11 and 11ᵃ and link 12.

The respective resilience of the several springs must be suitably arranged so as to give a proper total elasticity as required in each particular case.

The described spring suspension is very satisfactory in operation, the advantages of the cantaliver springs being associated with that of the ordinary semi elliptical springs.

Obviously the described construction may be modified according to the particular circumstances or type of vehicle without departing from this invention.

What I claim as my invention and desire to secure by United States Letters Patent is:

1. A spring suspension for motor vehicles comprising laminated springs having their ends connected with the vehicle frame, parts bearing the wheels each connected with the intermediate portion of said springs and other laminated springs pivoted by their intermediate portions to the vehicle frame, these latter springs having one end connected with the vehicle frame and the other end connected with said wheel bearing parts.

2. A spring suspension for motor vehicles comprising laminated springs having their outer ends connected with the vehicle frame and their intermediate portions secured to a member, parts bearing the wheels and connected with said members, and other laminated springs pivoted by their intermediate portion to the vehicle frame, these latter springs having one end connected with the vehicle frame and the other end connected with said member.

3. A spring suspension for motor vehicles comprising laminated springs having their ends connected with the vehicle frame, sleeves secured to the intermediate portion of said respective springs, parts bearing the wheels and pivoted in said sleeves, and other laminated springs pivoted by their intermediate portions to the vehicle frame, these latter springs having one end connected with the vehicle frame and the other one connected with said sleeve.

4. A spring suspension for motor vehicles comprising laminated springs having their outer ends connected with the vehicle frame and their intermediate portions secured to a sleeve, parts bearing the wheels and pivoted in said sleeves and other laminated springs pivoted at their intermediate portions to the vehicle frame, these latter springs having one end connected with the vehicle frame and the other end connected with said sleeves.

5. A spring suspension for motor vehicles comprising laminated spring sections having their outer ends connected with the vehicle frame and their intermediate portions secured to a sleeve, a rear axle carrying the rear wheels and mounted in said sleeves and other laminated springs pivoted by their intermediate portions to the vehicle frame, these latter springs having one end connected with the vehicle frame and the other one connected with said sleeves.

6. A spring suspension for motor vehicles comprising laminated springs having their ends connected with the vehicle frame, members secured to the intermediate portions of said springs, axles carrying the wheels and connected with said members and other laminated springs pivoted by their intermediate portions to the vehicle frame, these latter springs having one end connected with the vehicle frame and the other one connected with said members.

In testimony whereof I affix my signature in presence of two witnesses.

VINCENZO LANCIA.

Witnesses:
SEPPRIO RODOLFO,
MARIAS DE GIORGIS.